United States Patent [19]
Poor

[11] Patent Number: 5,452,379
[45] Date of Patent: Sep. 19, 1995

[54] IMAGE CAPTURE AND STORAGE TECHNIQUES IN ASSOCIATION WITH OPTICAL MARK READING

[75] Inventor: David D. S. Poor, Meadowbrook, Pa.

[73] Assignee: Meadowbrook Industries, Ltd., Burlington, N.J.

[21] Appl. No.: 759,240

[22] Filed: Sep. 13, 1991

[51] Int. Cl.6 .......................... G06K 9/20; G06K 7/10; G06K 7/14; G09B 7/00
[52] U.S. Cl. ................................. 382/317; 395/148; 434/358; 434/362; 235/454
[58] Field of Search ................ 382/61, 9, 1; 395/149, 395/148, 147, 425, 600, 100; 235/454, 456, 385, 379; 434/349, 325, 358, 376, 362, 355, 360, 363

[56] References Cited

U.S. PATENT DOCUMENTS

| | | | |
|---|---|---|---|
| 4,760,246 | 7/1988 | Shepard | 235/454 |
| 4,797,946 | 1/1989 | Katsuta et al. | 382/61 |
| 4,877,948 | 10/1989 | Krueger | 235/449 |
| 5,011,413 | 4/1991 | Ferris et al. | 434/358 |
| 5,027,421 | 6/1991 | Kanno | 382/47 |
| 5,038,392 | 8/1991 | Morris et al. | 382/61 |
| 5,039,847 | 8/1991 | Morii et al. | 235/379 |
| 5,134,669 | 7/1992 | Keogh et al. | 382/61 |
| 5,172,245 | 12/1992 | Kita et al. | 358/403 |
| 5,179,649 | 1/1993 | Masuzaki et al. | 395/148 |
| 5,213,373 | 5/1993 | Ramos | 283/5 |
| 5,245,166 | 9/1993 | Shepard | 235/456 |

OTHER PUBLICATIONS

Mano, *Computer System Architecture*, Prentice-Hall, 1982, pp. 240–245 and 494–499 and 510–515.

*Primary Examiner*—David K. Moore
*Assistant Examiner*—Michael Cammarata
*Attorney, Agent, or Firm*—Robert C. Podwil; Reed Smith Shaw & McClay

[57] ABSTRACT

A method of combined optical mark reading ("OMR") and image processing utilizes a response sheet having a grid of response positions suitable for marking and for processing by OMR and at least one response area for a response of an alphanumeric or pictorial nature, the response area encompassing at least one of the positions suitable for processing by OMR. The response sheet is scanned to detect the presence of data signifying marks at positions in the grid and the grid is sensed for marks capable of detection and reading by OMR. In response to the sensing step, an image in the response area of a response of an alphanumeric or pictorial nature is selectively captured and stored simultaneously with OMR.

4 Claims, 12 Drawing Sheets

INFORMATION FLOW

COMBINED OMR AND IMAGE CAPTURE

INFORMATION FLOW
COMBINED OMR AND
IMAGE CAPTURE

| LOCATION | CONTENTS | COMMENTS, NOTES |
|---|---|---|
| | IMAGE HEADER—88 | |
| 0 - 1 | NUMBER OF COLUMNS—88 | 16 bit VALUE |
| 2 - 3 | NUMBER OF ROWS—90 | 16 bit VALUE |
| 4 | DEPTH OF PIXELS—92 | 1, 4, 8 CURRENTLY SUPPORTED |
| 5 | STORAGE MODE—94 | 0, 1, 12, 13 FOR DEPTH 1<br>0, FOR DEPTH 4, 8 |
| | STORAGE OF LINES 1..n—96 | FORMAT DEPENDS ON MODE<br>ALL LINES IN IMAGE HAVE SAME<br>MODE BUT MODES FOR DIFFERENT<br>IMAGES MAY VARY |
| 6 ... z | BINARY DATA FOR LINE 1 | |
| z .. y | BINARY DATA FOR LINE 2 | |
| y .. x | BINARY DATA FOR LINE 3 | |
| ... | ... | |
| q ... p | BINARY DATA FOR LINE n | |

File M:\BUSINESS\IMAGE\FIGURE1.UIM,157 by 381 image at 150 DPI

IMAGE CAPTURE AND STORAGE TECHNIQUES IN ASSOCIATION WITH OPTICAL MARK READING

BACKGROUND OF THE INVENTION

This invention relates to image capture and storage techniques in association with optical mark reading processes.

Optical mark reading ("OMR") is a technique by which "marks" on paper documents are "read" or identified by means of optical equipment.

Marks are typically made to indicate a response, reaction, opinion, name or title, or to signify other information. Marks are often made in "grids" of responses corresponding to letters, digits, alphanumeric codes, test item responses, etc. In some cases, marks are made by equipment: when documents are first produced, i.e. printed by a forms printer, marks may be "filled in" to identify the document type and/or provide a unique number for the specific document. In some cases, a computer controlled printer may be used to fill in marks, such as to complete sections which would otherwise need to be completed by a person. Although they have many applications, OMR forms are most widely used for recording answers to multiple choice tests. Other applications include surveys, questionnaires, inventory control and the like.

Marks can be detected optically by the absence or presence of light: if sufficient light is reflected by the paper at a specific location, there is no mark. If sufficient light is absorbed that the intensity of the reflected light is significantly reduced, a mark is detected.

OMR processing works only on marks located in predetermined locations, or "response positions." Most OMR equipment is designed to read a specific "matrix" of such marks, typically with a fixed number of responses per inch in both the horizontal and vertical directions. Typical matrices include 6" by 6" (i.e. six responses per inch on a row of responses, and six lines or rows per inch), "6 by 8", "6 by 5", and "8 by 6".

Once the equipment has detected the presence of a mark at a specific location, conventional OMR applications store an appropriate character, code, or value so that subsequent processing properly reflects or recognizes the response intended by the person or machine and signified by the mark.

In a typical OMR device, the optical device(s) used to detect marks are contained in a "read head" which is in a fixed location. As the document is moved past the read head, successive rows of response positions are detected and processed.

Most OMR devices operate with discrete optical sensors for each response position on a row. Such devices are known as "fixed matrix" devices. Other OMR devices, however, based on a "line scan" camera, can be controlled to accept different spacing of the response positions within each row. By controlling the spacing between responses, these devices can process documents printed in one of several different matrices. They are, therefore, known as "variable matrix" devices.

Image Processing

Image processing refers to the process of capturing, in digital form, an electronic image of the entire document or parts thereof and store the image for processing, retrieval and display, or other purposes. One emerging technology, for instance, is document storage and retrieval in which an image of the entire document is stored for later viewing and/or printing.

Once an image has been captured, many different types of "image processing" can be performed to provide (a) storage and retrieval, (b) data capture or data recognition techniques, (c) more efficient decision making and evaluation, etc.

In one of its aspects, the current invention utilizes OMR to detect marks in areas designated for possible image processing. In these areas, then, the OMR response positions are not indicated on the document, and a person completing the document need not be aware that his or her responses will be processed utilizing OMR. In the present invention, OMR is used to detect the presence of marks in areas which require image processing. OMR is shown to also control the scope or dimensions of the image to be processed.

Combining OMR and Captured Image Processing

By combining the use of image capture technologies and image processing with OMR, as in the present invention, a hybrid process is created, providing significant advantages over OMR or image capture and image process alone. Limitations inherent in OMR can be overcome and significant new capabilities realized by adding image capture and image processing. By the same token, limitations inherent in image capture and processing can be overcome by adding OMR functionality. This invention relates to methods by which combined image processing and OMR provide capabilities not available with image processing alone or OMR alone.

At least two techniques can be used to achieve combined OMR and image capture capabilities. One technique is to add image capture and storage functionality to OMR devices, as described in my co-pending application Ser. No. 07/759,396, filed Sep. 13, 1991 entitled "Apparatus and Method for Image Capture and Storage in Association with Optical Mark Reading". A second technique is to add OMR capabilities to existing image scanning devices.

The first technique may be preferable, especially for high-volume applications, since the OMR process can be executed while the image is being captured rather than waiting until the image is prepared before the OMR process can begin. This technique, however, tends to require relatively complex, and perhaps somewhat expensive hardware systems.

The second technique may be advantageous for low-cost and low-volume applications in which time considerations are not especially critical. Inexpensive full-page scanners can be used to first capture a full-page image, after which software is used to compute the appropriate OMR response positions. A corollary method would be to use conventional facsimile (Fax) equipment to capture the image of a document for subsequent processing, either locally or remotely.

Limitations Of OMR

This invention addresses at least three areas in which the desirability or practicality of OMR is limited by the OMR process itself. These are (1) situations involving response grids of excessive size, (2) processing of "open ended" responses, and (3) verification procedures.

Response grids of excessive size

In OMR applications, needed information can often take up too much space on the document. Alpha or alphanumeric "grids" are especially problematic. For example, in a 6 by 6 matrix document, approximately 20 square inches of the document are used to capture only 20 characters of a name. Machine completed codes to identify a specific document require a minimum of 3 inches by ½ inch.

Processing of "open ended" responses

Since OMR can only recognize the absence or presence of marks, written verbal responses cannot be directly converted into machine-readable text. Some OMR equipment can recognize the presence of such "open ended" responses, but there is no sensing or recording of the meaning of the response. In some applications, coding personnel must read and understand all open-ended responses and record marks to "code" the response into a predetermined category: this is an expensive, labor-intensive process. For other applications, all open-ended responses must be processed manually. On election ballots, for example, "write in" candidates must be hand-tabulated.

Verification procedures

Some recognized potential OMR applications, such as the counting of proxy ballots and closed circulation magazine applications, require signatures. The usefulness of OMR in such applications has been restricted because of the need to retrieve the documents on demand for verification.

Limitations Of Image Processing

There are several areas in which the desirability or practicality of image processing is limited by attributes of the image capture process and processing. These include (1) excessive computing time requirements, (2) excessive electronic storage requirements, and (3) errors in recognition.

Excessive computing time requirements

In all steps of image processing, significant computing is required due to the massive amounts of data being processed. Especially with complicated image manipulation, where computations need to be made on thousands or millions of data points, and with recognition software, such as optical character recognition (OCR) or bar code reading, the number of computations needed is very large. For example, typical OCR applications require from 15 seconds to over two minutes to process one page after the image of the page has been captured. In contrast, typical OMR applications take from 8 seconds on slow table-top models to less than ½ second on fast models including the scanning, with actual OMR processing almost always taking less than a few seconds.

Excessive electronic storage requirements

To store both sides of a full 8 ½ by 11 inch document, with an 8-bit gray scale (as used by the equipment in the embodiment described below), at 100 DPI (100 dots per inch in both the horizontal and vertical dimensions) or better, storage requirements are equivalent to one million, eight hundred and seventy thousand (1,875,000) characters of information, or the equivalent of 935 pages of text. Compression techniques can partially overcome the space requirements, but compression techniques require additional computing time and exacerbate the computing time requirement.

Errors in recognition

Even OCR of printed, typed, or laser output has errors (based on PC Magazine review, for Courier 12 point, Laser-Jet output, between 77 and 0 errors per page). Although the technology is emerging, recognition of hand-written digits and letters is still unreliable. Recognition of bar-codes, specialized numerics, and other specially printed computer-readable information is more reliable, but limited in applicability.

In summary, processing of captured images can be slow, time consuming, and inaccurate. The benefits of image processing, as shown below, justify it in appropriate applications.

Advantages Of OMR

OMR processing permits extremely accurate, extremely rapid capture of information, especially when each response can be entered with a single mark or response. All other methods of data capture from paper documents require much more extensive electronic or manual processing.

Advantages Of Images

Image processing permits high-resolution (100 dots per inch or higher) capture, storage, and processing of visual information. Image processing can be used store and reproduce images, such as reproduction of hand-written text or photographs; it can also be used to recognize specific patterns including bar codes, mechanically printed characters, and hand-written characters.

Storage Of Image Data

This aspect of the invention relates to a storage technique to store multiple images captured in association with OMR. Results of traditional optical mark reading (OMR) are stored in digital form with a single "record" for each document read. Within this record, specific fields contain the characters, codes, or values to reflect the particular marks detected on the document. In combining image processing with OMR, images are also saved in digital form. The current invention discloses a method for storing and retrieving the images.

In the preferred implementation of image storage in association with OMR, two separate digital mass storage files are created. The first contains the traditional OMR records with additional fields added to identify and locate images in the second file: this first file is referred to as the "text file". The second file contains binary data to permit the reconstruction of the image in visual form: this file is referred to as the "image file". In the preferred implementation, there is a single image file for each text file, with multiple records of possibly varying lengths in the image file to contain the stored images. Within each record containing an image, appropriate "header" information precedes the binary data representing the image to indicate the dimensions of the stored image, the depth in bits of each point in the image, and the storage mode, or compression procedure, used to store the image.

A significant advantage of this technique is that it permits the efficient retrieval of images associated with specific documents during subsequent processing.

Combined OMR And Image Processing

Because of the speed of OMR relative to image processing, it is preferable that OMR be used as much as possible, and image processing be used when needed.

In accordance with the invention, documents are processed by OMR with specific areas on the document identified for image processing. Optical mark reading performs all traditional OMR functions and detects marks within the area(s) requiring image processing. Image processing is performed only on documents for which (1) the OMR processing determines that the form is valid, and the (2) OMR processing detects marks within the image area.

When image processing is required for a document, the captured image is stored as part of a multiple image file, with information needed to retrieve that image saved in the file containing the OMR responses.

OMR and image processing may be combined advantageously for many possible practical applications, including (1) text storage and retrieval, (2) analysis of open-ended responses, (3) storage and retrieval of signatures, (4) recognition of patterns or characters, (5) storage and retrieval of photographic images or artwork, (6) improved Key-Entry procedures.

Text storage and retrieval

Use of images to store and reproduce textual information permits inexpensive and rapid storage and retrieval of text. Information can be completed in a relatively small area of the document if it is only in normal written or printed form, thereby overcoming the size limitations of OMR. For example, name and address can easily be completed in a 1" by 3" block, a total of 3 square inches for up-to 200 characters of information. By storing the digitized representation of the information as it appears, the time and costs needed to convert the information to text characters (e.g. OCR, key-entry) can be avoided with resulting cost savings. The information can be subsequently reproduced on a computer screen, laser printer, or other pixel-based device with essentially the same "image" as the information on the original document.

When used in conjunction with OCR, OMR data capture can be used to establish identification, e.g. record number, client number, for subsequent identification of the portion of the image that is saved. All normal data processing functions, then, are based on the fast and reliable OMR information, and the image processing is reserved for only those areas of the original document that require additional processing or retrieval of a visual representation.

Analysis of open-ended responses

Use of images to store "open ended" responses permits maximal flexibility and overcomes another limitation of OMR. The image of an open-ended response can be stored for subsequent retrieval and display on a computer screen, laser printer, or other pixel-based device. This will permit subsequent coding, interpretation, etc., and will provide researchers with images of the original source materials.

As with text identification fields, OMR can be used to provide rapid and accurate information for all data from the document except the relatively small portion required for open-ended responses. If there are no open ended responses, no image data need be saved. When open-ended responses are saved, the image processing can be limited to that small area alone and thereby overcome the time and space limitations of image processing.

Storage and verification of signatures

Image processing provides a method to store information needed for verification and identification, such as signatures, and thereby overcomes a limitation of OMR processing alone. Signatures and other verification information can be stored for subsequent retrieval thereby obviating the need to retrieve specific documents except under the most unusual of circumstances.

As with the previous examples, it is preferable that OMR be used for all other processing to avoid the limitations of excessive computation or storage requirements associated with image processing.

Recognition based on patterns or characters

Combined OMR and image processing permits what could be called "hybrid" data capture, in which some data are captured with the extremely accurate and rapid OMR process, while additional information is derived through additional processing of the image using existing or novel image processing techniques. Such processing would require the "recognition" of specific patterns or codes. The stored image provides the necessary data for recognizing and converting to characters, text, or numbers a wide variety of information including: (1) Bar-codes in a variety of formats; (2) Machine-produced or printed text; (3) Soft-Strip or other encoded text; (4) Hand written digits; (5) Hand written letters.

Storage and retrieval of photographic images or artwork

Combined OMR and image processing permits the inclusion of photographic images or drawings incorporated on OMR forms through storing gray-scale images for subsequent display or printing. This feature has applications in many data collection and research applications.

Especially in such applications, which typically require 8-bit gray scale values for each point in the photograph or drawing, the use of OMR for all areas on the form except the photograph or drawing will overcome the severe computer resource limitations attendant image processing alone.

Improved key-entry procedures

Combined OMR and image storage and retrieval also permits increased efficiency in key-entry of data on forms with combined OMR and key-entered data capture, such as for entering changes in an existing name and address database. By presenting the image of hand written information to be key-entered on the same computer screen with the entry fields, productivity and accuracy can be significantly increased.

In this environment, key-entry personnel would not need to use the paper documents at all, and, by presenting both the source and entry fields on the same monitor, they would not lose time changing their view from input to entry fields. Once again, the appropriate use of OMR will obviate much of the data capture, thereby significantly reducing keystrokes and thereby reducing errors and data capture costs.

BRIEF SUMMARY OF THE INVENTION

The present invention adds to conventional OMR the function of capturing and storing the part or the entire image of the document, concurrently with the existing OMR process so that all or part of that image can be used or processed to overcome the three above limitations of OMR alone.

In general, the method involves a response sheet having thereon a grid of response positions suitable for processing by OMR, and at least one area for a response of an alphanumeric or pictorial nature, the response area encompassing at least one of the positions suitable for processing by OMR; scanning the response sheet to detect the presence of marks at positions in the grid; sensing in the grid the marks capable of detection and reading by OMR; and in response to that sensing, selectively capturing and storing in electronic memory the image of an area of the form, including a response of an alphanumeric or pictorial nature.

DESCRIPTION OF THE DRAWINGS

There are seen in the drawings forms of the invention which are presently preferred (and which constitute the best mode contemplated for carrying the invention into effect), but it should be understood that the invention is not limited to the precise arrangements and instrumentalities shown.

FIG. 3 depicts the file structure for the image file.

FIG. 4 depicts an exemplary information and data entry form, suitable for use in practicing the invention.

FIG. 6 depicts the exemplary information and data entry form with hand written name and address and appropriate demographic information completed.

FIG. 8 depicts portions of several exemplary information and data entry forms with the open-ended item completed.

FIG. 12 depicts the exemplary information and data entry form with a machine pre-printed name and address in the address block, with hand written changes entered below, and with a photograph attached.

DETAILED DESCRIPTION

Figure 1:
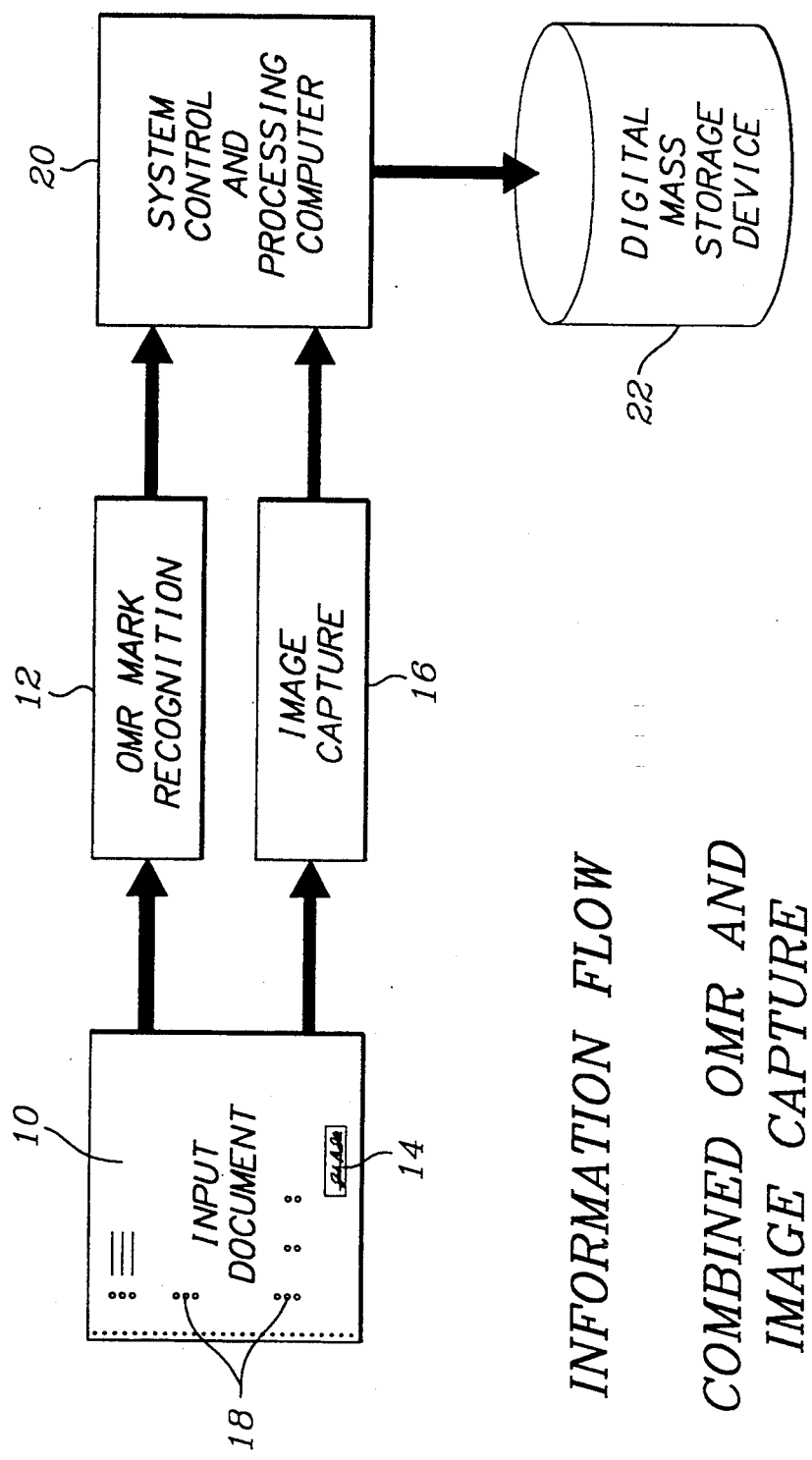
FIG. 1 is a block diagram, depicting, in broad concept, the capture and storage of image data in association with OMR.

Referring now to the drawings in detail, wherein like reference numerals indicate like elements, there is seen in FIG. 1 a block diagram, depicting in broad concept of a process for the capture and storage of image data in association with optical mark reading. A preferred apparatus and method for image capture and storage are disclosed in a co-pending application, Ser. No. 07/759,396, filed Sep. 13, 1991, for "APPARATUS AND METHOD FOR IMAGE CAPTURE AND STORAGE IN ASSOCIATION WITH OPTICAL MARK READING", the disclosure of which is incorporated herein by reference. An input document 10, which, for example, may be a multiple-choice test or a reader survey card for a controlled circulation magazine, is optically scanned as indicated by the block 12, for mark recognition and recording, using OMR techniques. The same scanning operation concurrently senses an image on the input document 10, designated by the reference numeral 14. The image consists in this instance of a signature although it could be any written or printed numeric, alphanumeric, or pictorial matter, and the image 14 is captured as indicated by the block 16. Data signifying marks 18, and the captured image 14 are transmitted to a system control and processing computer designated by the reference numeral 20, there to be conditioned or further processed for storage in a mass storage device 22. The captured image may be that of the entire document 10 including the marks 18.

Figure 4:
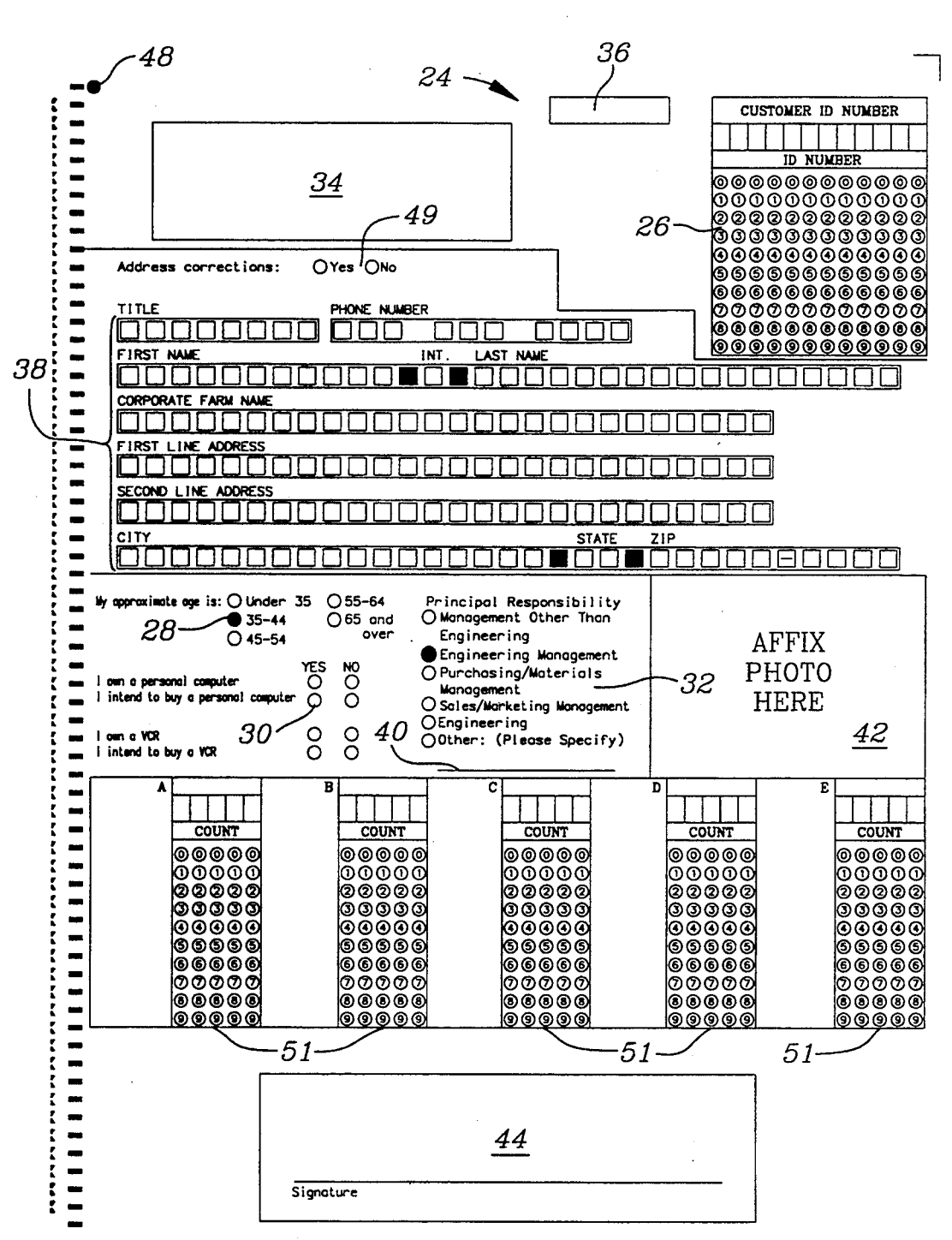

Referring now to FIG. 4, an exemplary information and data entry form will be described in greater detail. The illustrated response (data entry) form, designated by the reference numeral 24 (and which may correspond to the above-mentioned input document 10), provides response areas intended for OMR processing such as the areas 26 through 44, for marks indicative of the user's responses to such typical matters as an identification number (area 26), the respondent's age (area 28), and responses to a series of demographic questions (areas 30 and 32). The marks in areas 26 through 32 may be read by conventional OMR techniques.

The exemplary form 24 also provides areas such as the areas 34 through 42 in which an image may appear which, in accordance with this invention, may be captured and stored. The area designated 34, may contain a hand written name and address. The area designated 36 may be used to hand write a code or notation. The area designated 38 consists of six lines of boxes in which handwritten characters may be entered to indicate a change in the name or address information. The area designated 40 invites an open-ended verbal response. The area 42 may be used for a photograph. The area 44 may be used for a signature.

Figure 5:
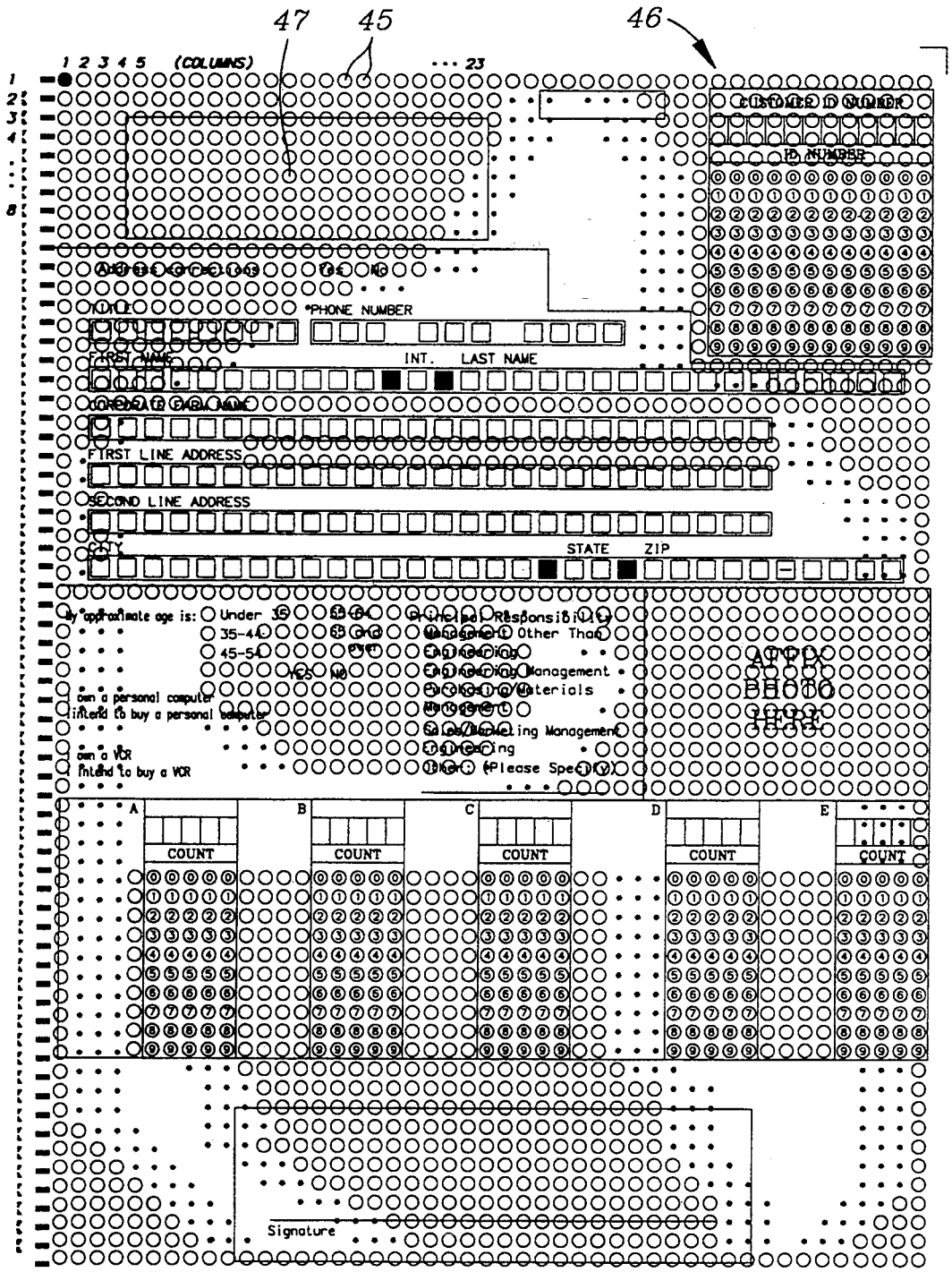
FIG. 5 depicts the exemplary information and data entry form with all possible optical mark reading response positions shown.

Referring now to FIG. 5, there is seen a presentation of the same exemplary form as shown in FIG. 3, with the entire OMR response matrix disclosed, this composite form being designated generally by the reference numeral 46. In the illustrated form 46, all possible response positions in the OMR response matrix have been depicted. It should be understood that response positions 45 are not normally visible except when intended for use in OMR such as 26 through 32 in FIG. 4. In accordance with this invention, image type responses must be located in predetermined image response areas, i.e. those areas in which an image may be present and needs to be captured and stored. Before attempting to capture and store an image from an image response area, the OMR response positions in that area are examined to detect any possible marks. If marks are identified, then the image processing is performed. If no marks are detected, no image processing is needed. By way of illustration, referring now to FIGS. 4 and 5, the OMR response positions corresponding to the name and address block 34 in FIG. 4 are in horizontal rows 4 through 8 of the response positions, and in vertical columns 5 through 23 inclusive, this subset of rows and columns being indicated collectively by the reference numeral 47 in FIG. 5. The exemplary information and data entry form 24, shown in FIGS. 4 and 5, has been found to be capable, when used as described below, of realizing the above-mentioned advantages of combining OMR and with image capture.

OMR Data Processing

Response positions are printed on the form for OMR responses in four areas:

1. Identification: a 12-digit numeric field designated 26;
2. Address correction: a single response item designated 49;
3. Demographics: five items of social-economic indicators designated 28 through 32;
4. Count fields: five fields of five digit numeric grids designated 51.

A single pre-printed response position (to the left of words "UNISCORE, Incorporated" in the upper left corner of the form) and designated by the reference numeral 48 is also checked by the OMR process to ensure that the correct document is being processed.

All other areas on the form may be processed by some form of image processing. For each potential field, OMR is used to identify whether or not something is written or printed in that space. This is accomplished by "reading" using OMR techniques, the response positions that exist in the area even though the response positions are not marked on the form. As an example, referring to FIG. 5, the area designated 47 shows the response positions which can be sensed within the name and address block 34.

If a mark is detected in the appropriate area, the OMR process can (a) place a "flag" in the output record to indicate that the appropriate image processing function was invoked, and (b) invoke the appropriate image processing function. If no mark is identified, and if the image processing function is optional, the image processing function can be bypassed, saving computer time and storage. If no mark is identified, but the image processing function is nevertheless desired or required by the particular application, the image processing function can still be bypassed, and the OMR process can provide appropriate error messages or error conditions indicating the lack of a proper image contents without executing the image processing function.

Text storage and retrieval

Based on the exemplary information and data entry response form 24 in FIGS. 4 and 5, an application of the patent invention, using names and addresses written in the name and address block 34, will now be described. In this application, the goal of a marketer might be to mail information to qualified respondents based on their socio-economic indicators.

As has been explained, the image processing is only done if needed. If the OMR processing of socio-economic questions on the form 24 identifies responses indicating a qualified respondent, and if the OMR processing of the unprinted response positions in the name and address block 34 detects the presence of marks there, then the name and address block 34 can be saved from the image of the sheet and written to a file for later printing on address labels. If either of the two conditions is not met, the image processing can be simply bypassed.

It should now be apparent that for each sheet scanned, a data record can be prepared with the OMR responses and the location of the image of the name and address, if saved.

Figure 6:
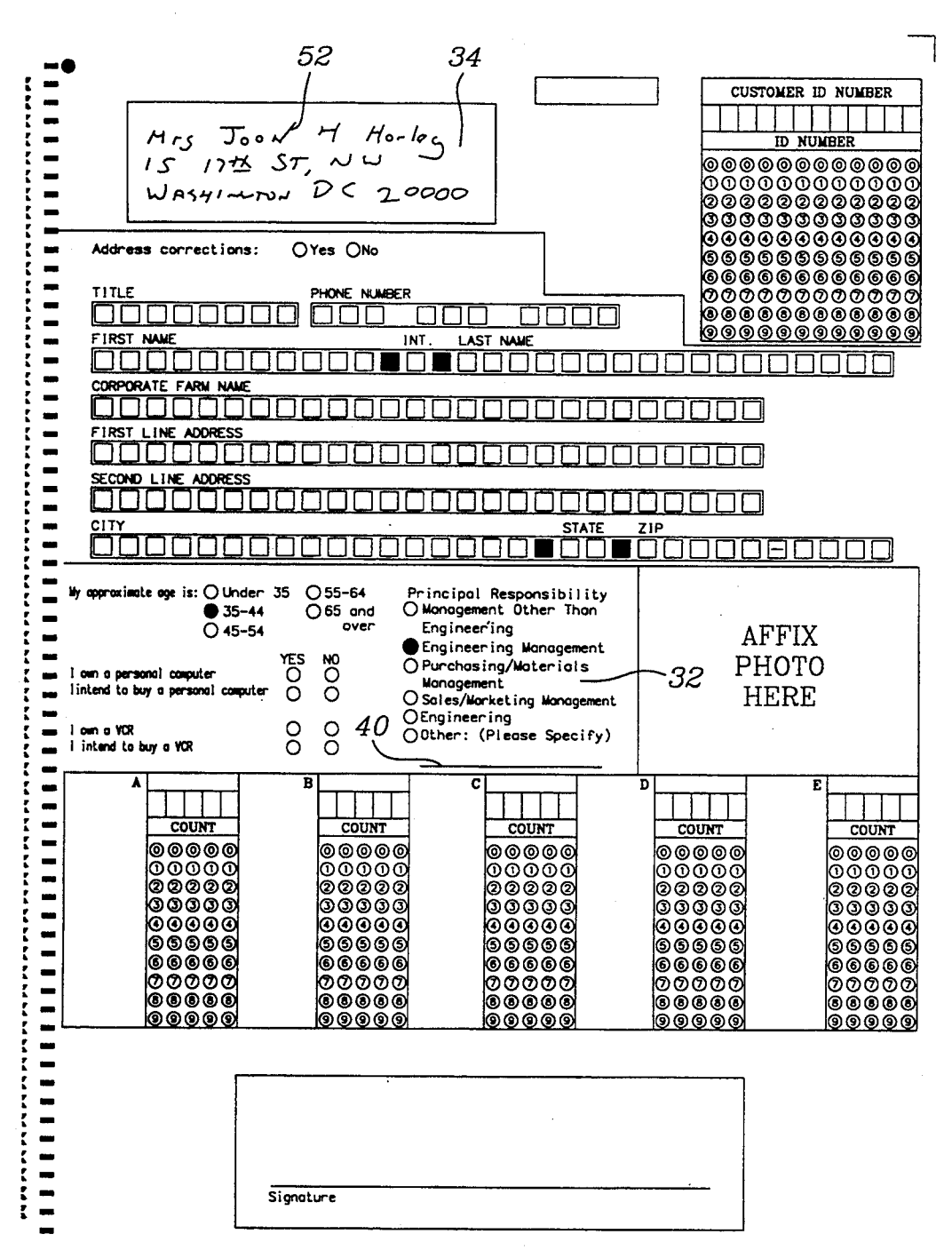
Figure 7:
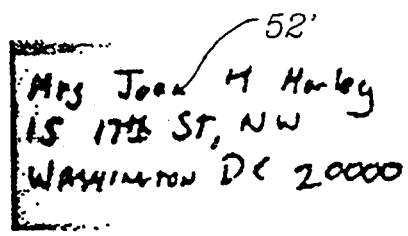
FIG. 7 is a reproduction of a laser-printed label with the handwritten address reproduced following retrieval of the stored image.

FIGS. 6 and 7 show sample text for this application of the present invention. FIG. 6 depicts the name and address field 34 as completed on the exemplary information and data entry response form 24. A hand written address is here designated by the reference numeral 52. FIG. 7 is a reproduction 52' of the name and address as recalled from storage and printed by a laser printer, based on the image 5 of the address 52 stored on disk. The image 52' is thus digitized reproduction of the hand written text 52.

It is anticipated that a particularly advantageous application of the present invention will be for responding to inquiries from the public. For example, a widely-used marketing tool is the so-called "Reader Response Card" commonly provided with periodicals or other printed matter. Such cards invite people to indicate that they want information on specific products or services by marking an appropriate number. By combining OMR to record which numbers were marked and image storage of the entire name and address block 34, highly efficient and effective processing can be achieved. Instead of key-entering each response and the name and address, all data will be computer processed through OMR or image storage of the text. Then, for each advertiser, product, or service, a set of labels can be prepared with the stored and recovered image of the name and address printed thereon. This process will not only provide substantial cost savings, but will provide address labels with fewer errors and less likely to be rejected by the postal service as undeliverable.

Analysis of open-ended responses

Based on the Job Function question 32 (FIG. 4), the image processing advantages of combined OMR and image processing can be demonstrated for open-ended questions. For this item, it has been found that most respondents respond to one of the printed options with a single OMR mark in the appropriate circle. However, some respondents will mark the "other" response position and write in appropriate text in the space provided, designated 40.

For this application, the OMR process, by sensing the response "other", determines those respondents for whom it is necessary to store the open-ended response 40. When the "other" response position is completed, and some marks are found in the space 40, the OMR process will invoke the storage of the text for subsequent processing and interpretation, and/or present the text on the screen for immediate coding into an appropriate category.

Figure 8:
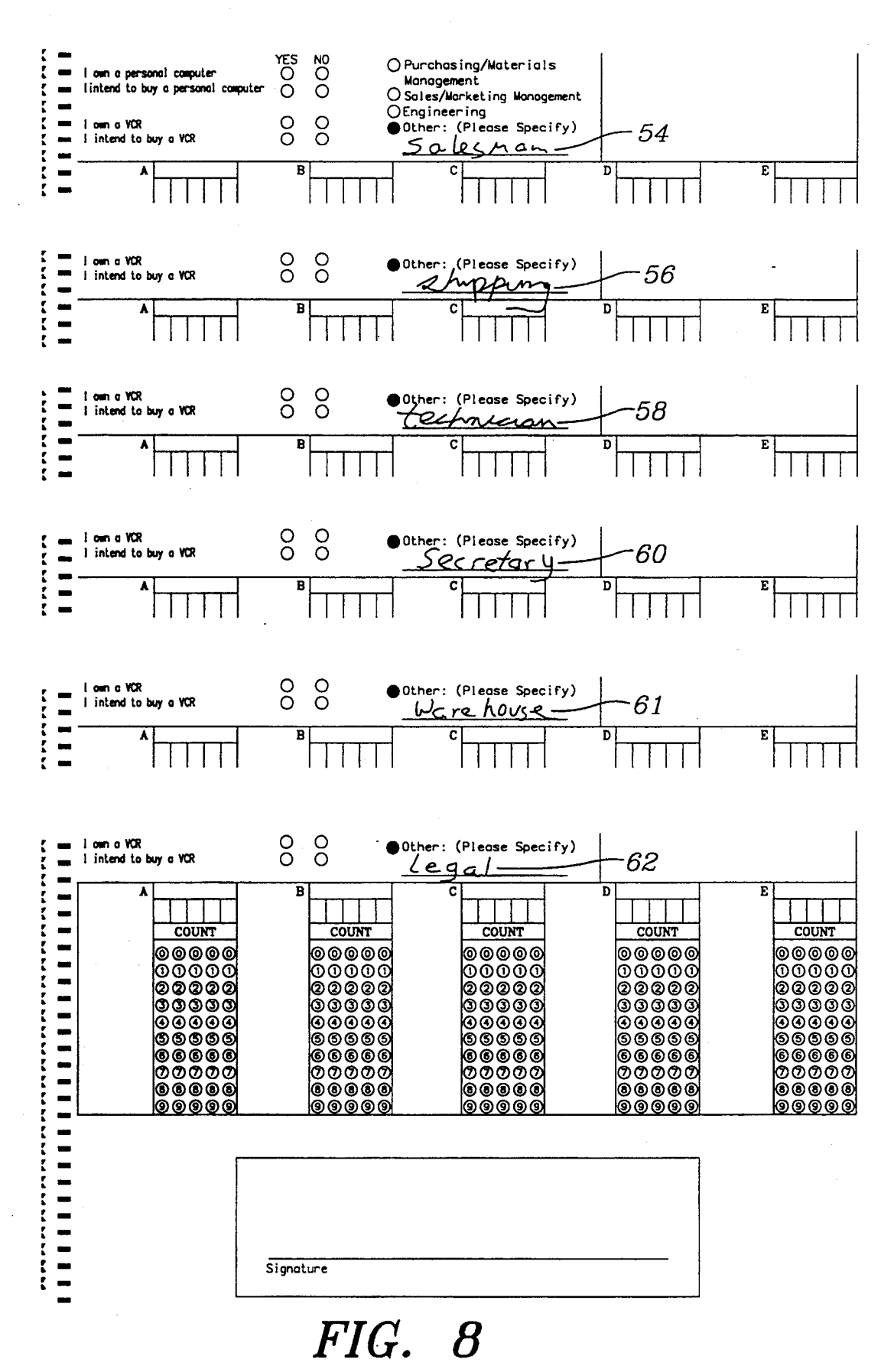
Figure 9:
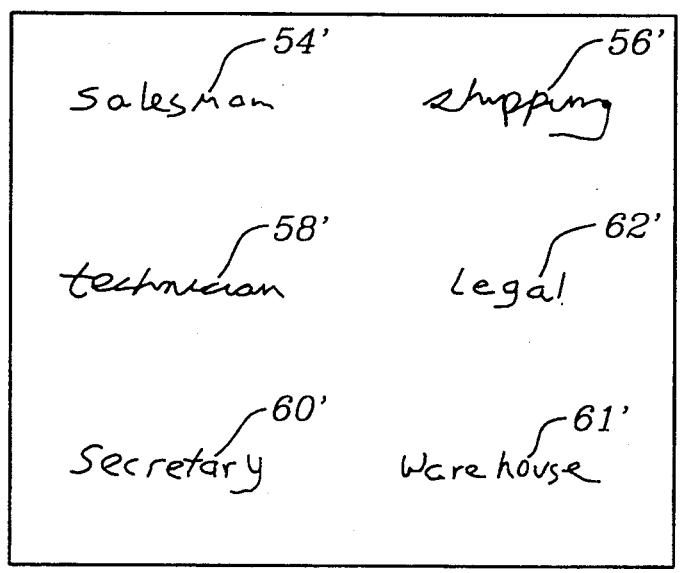
FIG. 9 depicts a laser-printed report showing several responses given to the open ended item, including the response shown in FIG. 8.

FIG. 8 shows copies of fragments from several forms in which the open-ended item 40 has been completed with the hand-written responses designated 54 through 62. FIG. 9 shows a single page of laser-printed report 64 including both text 65 and a series of images of the responses 54 through 62 (here 54' through 62') are presented.

Storage and verification of signatures

For tests administered in commercial settings, for proxy elections, for closed circulation readership qualification, and other applications, it is necessary to collect and maintain a signature for subsequent display.

In the exemplary information and data entry form 24, the signature is at the bottom of the form. This signature can be tied to the data captured in the OMR process and made available for subsequent display or printing if needed for verification.

Figure 10:
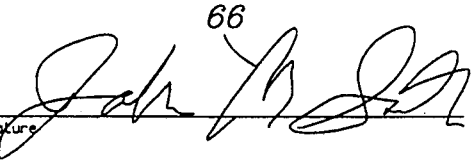
FIG. 10 depicts the exemplary information and data entry form seen in FIG. 4 with the signature completed.
Figure 11:
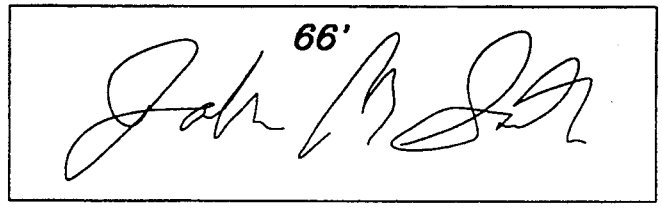
FIG. 11 is a reproduction of the image shown on a computer screen displaying the signature from the form shown in FIG. 10 following retrieval of the stored image.

FIG. 10 shows a sample form 24 with a signature 66, while FIG. 11 is a representation of a computer screen image displaying the digitized image 66' of the signature.

Recognition based on images

Figure 12:
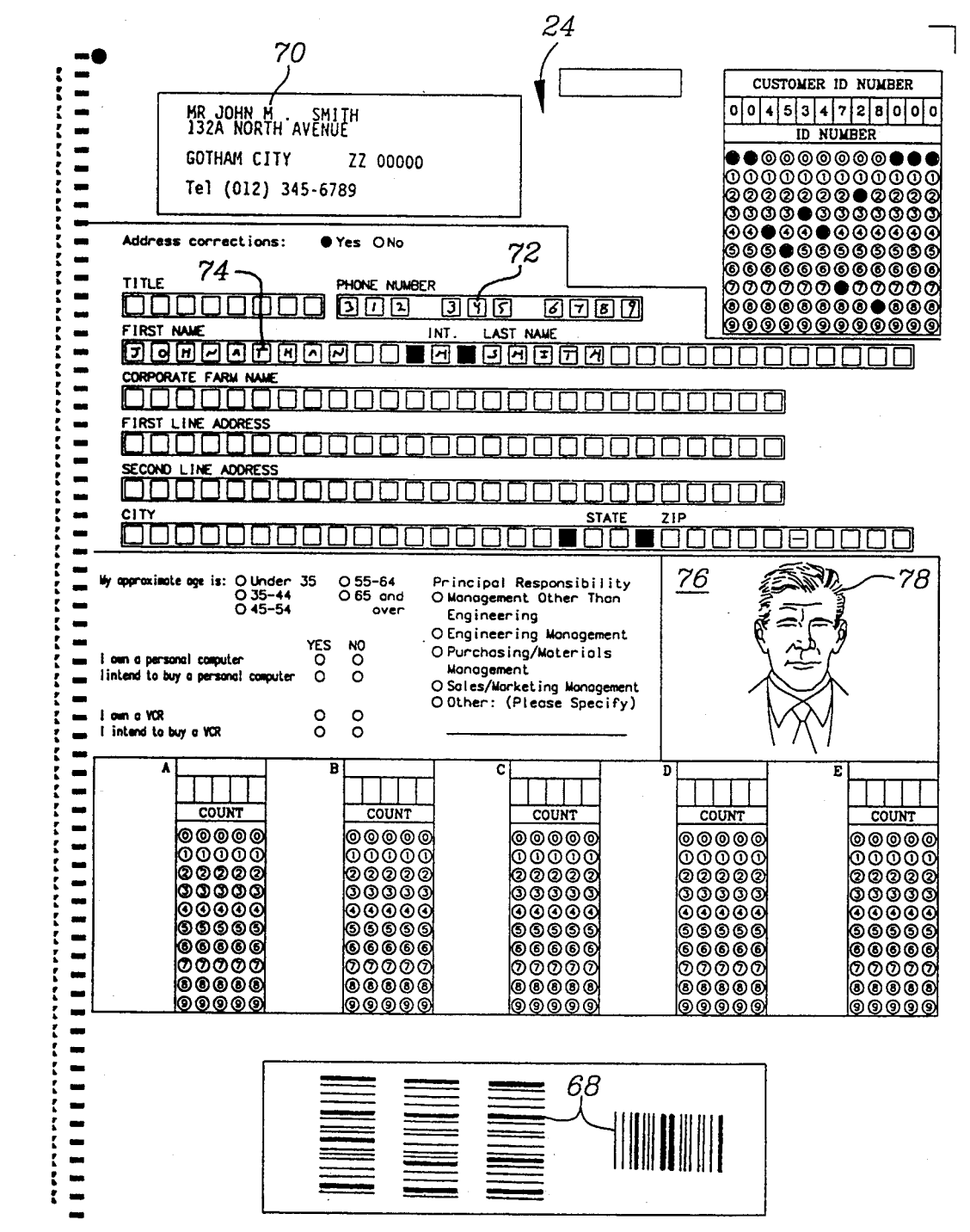

Referring now to FIG. 12, some visual and printed images have sufficient detail to permit recognition of images to convert from images to characters based on many possible implementations including, but not limited to:

1. Bar-codes in a variety of formats, such as the bar-code element 68 seen in FIG. 12, read by conventional bar-code reading hardware and software.

2. Machine-produced or printed text, such as might be pre-printed in the address box 70 in FIG. 12, such machine-printed text being conventional Optical Character Recognition (OCR) techniques.

3. "Soft-Strip" or other encoded text—based on appropriate algorithms by Soft Strip or other vendors of encoding.

4. Hand written digits, based on conventional hand written numeric field recognition software, to process hand written digits such as those in the phone number area of the address change block 38 (in FIG. 4) and designated by the reference numeral 72.

5. Hand written letters, based on conventional hand written character recognition software to process hand written characters, such as those in the name area of the address change block 38 and designated by the reference numeral 74.

Such recognition techniques, however, require extensive computation, and generally have the effect of degrading the throughput of the entire process. On the other hand, these recognition processes can yield functional advantages, albeit at a cost in speed and, in some cases, accuracy.

Merging of photographic or artwork

It has been found that with the 8-bit gray scale (256 values), the combined OMR and image capture system of the present process provides sufficient detail to create a reasonable and useful image of a photograph, drawing, or other image. Unlike storage of text and signatures, which can be stored in "1 bit" deep, black and white format, the storage of photographic images requires gray scales for practical display and reproduction, and therefore requires far more storage capacity: eight times as much in the current case of a 256 point gray-scale. The use of photographic images and/or drawings in conjunction with OMR provides significant, critical functionality for some specialized applications. Referring again to FIG. 12, using the exemplary information and data entry form 24, a photograph or drawing can be affixed in the "photo here" area 76 with the photographic image indicated by the numeral 78. A digitized image of the photograph or drawing, 78, can be stored on disk for later display and possible printing.

Improved Key-entry procedures

The use of combined OMR and image processing in accordance with the invention permits extremely efficient use of key-entry procedures to capture data. Using OMR to capture as much data as possible, the basic data records are captured. The image is ideally captured at the same time.

Referring now to FIG. 5, under control of the OMR processing, fields such as those in the address-change field 38, which are potentially key-entered, can be checked by the OMR process: if a field is completed (i.e. there are some marks in the area), the image of the field can be saved for subsequent key-entry. In the example shown in FIG. 12, the phone number line and the name line of the address change area 38 contain hand written changes 72 and 74. These hand written marks are detected by OMR thereby, indicating the need for image processing to save the images of the changes. This same process is advantageously followed for all fields that are potentially key-entered.

In a subsequent operation, a key-entry operator can complete the data capture process. On the screen of a computer display, the saved image of hand written digits 72 and letters 74 are presented in a graphics format with the text field presented below so that the operator can enter the appropriate text characters. This process can result in significantly reduced key-entry times and reduced labor costs. This is so because: (1) only fields that need to be keyed are presented; (2) the key-entry operator does not need to turn papers: images and fields are controlled by the presentation and entry software; (3) the key-entry operator can remain focused on a single area, i.e. the computer screen, and does not need to shift between the screen and a "source document".

In the above-described example, address corrections may or may not be entered for a given document. In this instance, the name and address block is pre-printed with the name and address as exists in a pre-existing database. At the same time, the ID number is pre-coded, i.e. the appropriate OMR response positions are filled in by computer to guarantee that the ID number read by the OMR process will properly "tie back" to the database. If an address change is made, the OMR process will recognize that there are marks in the field, and will cause the image of that field to be saved and indicate in the data record where that image is located. This process can be performed separately for each of the seven fields (designated by the boxes around the spaces for the appropriate letters or numbers), for the entire set of seven fields, or for each line of fields. In the sample program described below each line is treated separately, and the image is saved from the first changed line through the last changed line so that at most one image is saved per document. When the fields are subsequently presented for key-entry, the hand written images will appear at the top of the screen, and the appropriate text entry fields will appear at the bottom. Ideally, applications can present the prior information in the text fields so that operators will have the choice of changing only needed characters. Fields that are unchanged can be left alone.

Figure 2:
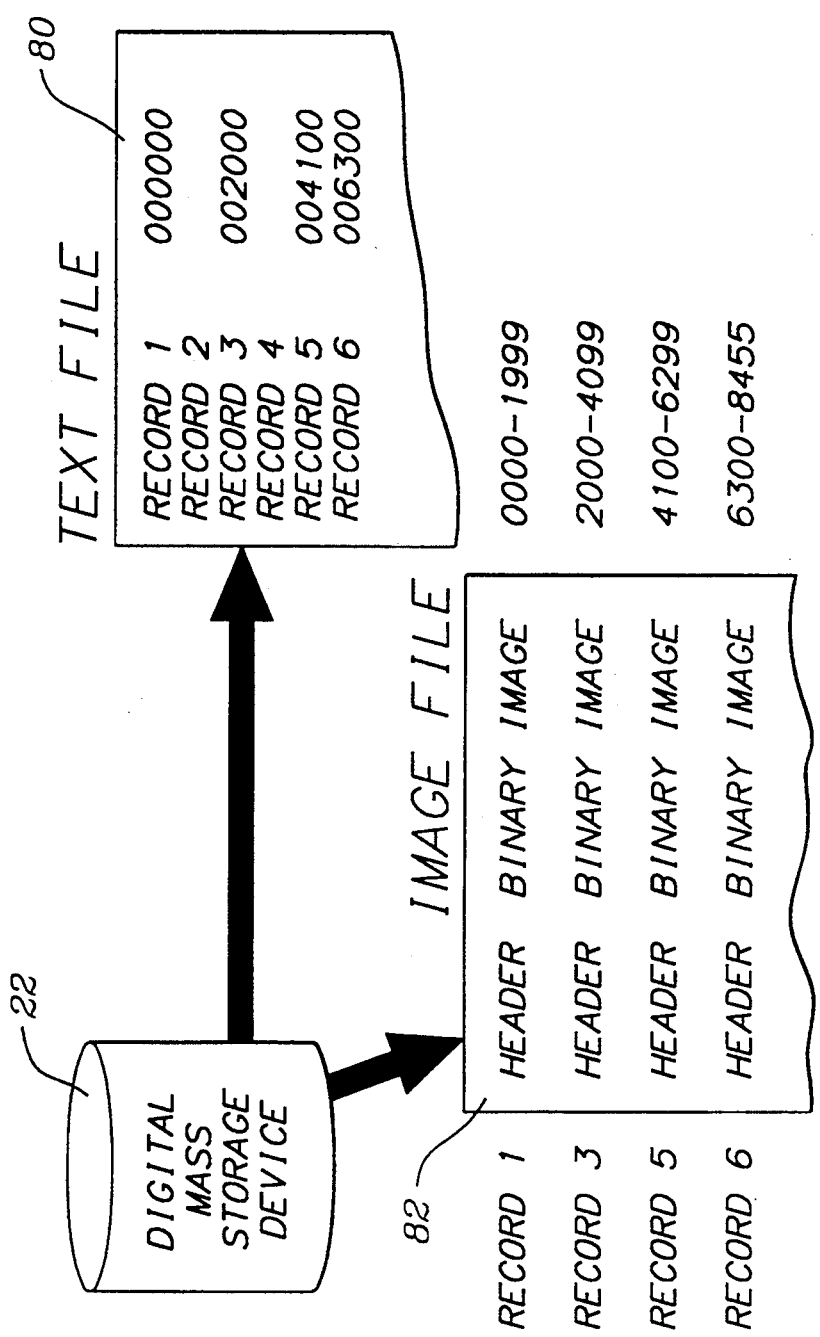
FIG. 2 depicts the two files that are stored and indicates their interrelationship.

Referring again to FIG. 2, the method of storing multiple images on the mass storage device 22 will now be described in detail. Two separate files are stored. The first, "text", file 80 contains information resulting from the optical mark reading processing. The record may contain information associated with processing a document, such as the date scanned, a document counter, the operator's identification. Typically there will be a single record for each document scanned, with the record numbers corresponding to documents processed. These records are suitable for traditional data processing and generally contain text or character information. For some applications, certain numeric or other data may be stored in binary, rather than character, form.

As described above, the processing of images is made dependent upon prior OMR processing. Optical Mark Reading is used to detect marks in an image response area, and the image is processed only when marks are so detected. When an image is processed, the digital representation of the image response area is stored in a separate, "image" file 82, in a binary image form as described below. The number of bytes of storage required to store each image may vary from image to image. The offset, relative to the start of the file, of the first byte associated with an image, is saved as a separate field in the output text file. In the example, the image for the first document, "Record", is stored in the image file 82 in bytes 0 through 1999 and its "offset" value of "000000" is part of the corresponding record 1 of the text file.

The second document has no image: therefore no information is stored in the image file and the corresponding field in record 2 of the text file is blank. The image for the third document designated 3 is stored in the image file in bytes 2000 through 4099 and its "offset" value of "002000" is part of the corresponding record 3 of the text file. The image information for each document processed is stored in the next available position of the image file so that each record image is stored in a variable length record.

Referring now to FIG. 3, the format of the variable length records containing the image data are shown. Each image record starts header information 86, which contains: the number of columns designated 88; the number of rows designated 90; the number of bits per pixel designated 92; and the mode of storage designated 94. The number of columns 88, specify the number of pixels per line, or the number of columns in each line of pixels for the current image. The number of rows 90, specifies the number of rows in the image. The number of bits per pixel 92 can be 1 (for black/white image), or 4 or 8 for gray scales of 16 or 256 values respectively.

The "mode" of storage 94 specifies the compression mode, if any, used to store the data. The data for the image, designated 96, follows immediately after the six-byte header.

Regardless of the mode used, each line of the image is written to the file consecutively such as shown 98 and 100 for lines 1 and 2. In the preferred implementation of this procedure, any unused bits in the last byte of a line are set to zero so that each line starts on an even byte bound. In the current implementation, five separate modes are defined for a black and white (1 bit deep) image. These modes are:

0: No compression: bit-mapped

1: String compression. Each byte is in form xnnnnnnn where "x" is 0 or 1 and nnnnnnn is a count from 1 ... 127. For each byte read, the high-order bit determines the type (0 or 1), and the count determines the number of times that bit is repeated in the output record.

2: Zero compression. A zero byte indicates that the next byte is a repeat count, i.e. the following byte contains the number of consecutive zero bytes from 1 to 255. A non-zero byte, other than a repeat count, is treated as 8 bit bit-pattern.

12,13: Correspond to Hewlett Packard Compression modes 2 and 3, "Tagged Image File Format rev 4.0", and "Delta Row Compression" as shown in Hewlett Packard PCL 5 Printer Language Technical Reference Manual, section 14. For this application, these data are stored without the constant escape codes. Therefore, the format is "bytecount, data", where "bytecount" is the binary number of bytes in the raster row data and "data" are the bytes in the raster row data.

The present invention may be embodied in other specific forms without departing from its spirit or essence. Accordingly, reference should be made to the claims rather than the foregoing specification.

APPENDIX

The outline of two exemplary software programs, demonstrating the use of image capture and storage in association with optical mark reading ("OMR"), are attached as an Appendix. The first program outline is written in "SCAN", a language developed by UNISCORE, Incorporated and MeadowBrook Industries, Ltd. The second is written in "PASCAL" and demonstrates image retrieval and display. Other programs may occur to those skilled in the art.

APPENDIX

The following program outline is written in the "SCAN" language (Copyright 1989-1991, UNISCORE, Incorporated and MeadowBrook Industries, Ltd.) to demonstrate the integrated use of OMR and image processing:

```
*********************************************************************
IMAGE DEMONSTRATION PROGRAM
Copyright © 1991: UNISCORE, Incorporated         ALL RIGHTS RESERVED
                  MeadowBrook Industries, Ltd.

This code is provided as a demonstration of proceedures to utilize OMR and image processing
    on the same document, and is solely for use (1) in association with a patent disclosure,
    and (2) as a demonstration of the combined use of OMR and image processing.
*********************************************************************

, *******************************************************************
, Initialization: display messages and determine which, if any, type
,                 type of image process to be used.
, *******************************************************************
CONTINUE        STARTENTRY
                DISPLAY         37,START_MSG    ,Display start message
OPR_ASK
                DISPLAY         33 OPR_MSG1     ,Display choices
                DISPLAY         33 OPR_MSG2
                DISPLAY         33 OPR_MSG3
                DISPLAY         33 OPR_MSG4
                DISPLAY         33 OPR_MSG5
                DISPLAY         32 OPR_MSG6
                DISPLAY         44 OPR_MSGASK
                OPERATOR        1  IMAGE_FLAG   , Get single character answer
                COMPARE         G 1 IMAGE_FLAG '6' OPR_ASK
                COMPARE         L 1 IMAGE_FLAG '1' OPR_ASK
                JUMP            OPENTEXT ,       Constants for initialization
START_MSG       TEXT            "IMAGE DEMONSTRATION PROGRAM, 08/28/91"

OPR_MSG1        TEXT            "Process ADDRESS BLOCK image?"                  1 "
OPR_MSG2        TEXT            "Process Open-Ended Item?"                      2 "
OPR_MSG3        TEXT            "Process SIGNATURE image?"                      3 "
OPR_MSG4        TEXT            "Process ADDRESS CHANGE?"                       4 "
OPR_MSG5        TEXT            "Process PHOTO image?"                          5 "
OPR_MSG6        TEXT            "OMR only: no image process?"                   6 "

OPR_MSGASK      TEXT            "Enter 1-6 for the image process you want: "
                BYTE            1 0

, *******************************************************************
,     Special purpose constants
, *******************************************************************
TR_12           TEXT            "12"   , Translation tables to change "1" to "Y"
TR_YN           TEXT            "YN"   , and "2" to "N"

CRLF            BYTE            2 13 10   , CR/LF ascii characters
```

```
,***********************************************************************
,      VARIABLES AND DATA RECORD BUFFER
,***********************************************************************

,                  Image Flag: Set to 1-5 (character) to select choice
IMAGE_FLAG         BSS            1

,                  Offset: location of image in number of bytes from start of file
Offset             DOUBLE         1   0    , Double word initialized to 0

,***********************************************************************
,
,                  Data Record buffer and area
,
,***********************************************************************
DATA_RECORD
,            First 10 positions are unused: possible expansion, count, etc.
PREFIX_FILLER      BSS            10       , 01-10 = FILLER ,                  Positions 11-54 are OMR response field representations
DR_IDNUMBER        BSS            12       , 11-22 = ID NUMBER
DR_CHANGEYN        BSS            1        , 23    = Address Change (Y/N)
DR_AGE             BSS            1        , 24    = Age (A-E)
DR_APPLIANCE       BSS            4        , 25-28 = 4 Y/N questions
DR_RESPONS         BSS            1        , 29    = Prin Resp (A-F)
DR_COUNT_A         BSS            5        , 30-34 = Five fields of
DR_COUNT_B         BSS            5        , 35-39   five digits each (0-9)
DR_COUNT_C         BSS            5        , 40-44   Right justified
DR_COUNT_D         BSS            5        , 45-49
DR_COUNT_E         BSS            5        , 50-54

,       Six positions for future expansion
                   BSS            6        , 55-60 = FILLER ,       Image type and offset
DR_IMAGETYPE       BSS            1        , 61    = Image type (1-4,5=none)
DR_IMAGEMARK       BSS            1        , 62    = OMR Mark found in image area?
DR_OFFSET          BSS            6        , 63-68 = Numeric offset value BSS            32       , 69-100= Unused FILLER DR_CRLF            BSS            2        , 101-102 = CRLF FOR ASCII
,       **** END OF THE DATA RECORD ****
,***********************************************************************
,  OPEN THE OUTPUT TEXT FILE:
,***********************************************************************
OPEN_TEXT          MOVE           1 IMAGE_FLAG FILENAME+7
                   SYSTEM         100        , "System" call to open file
FILENAME           TEXT           "M:IMAGE?.DTA "

DELETE         S          , Enter write w/o output
                   WRITE          102 Data_Record  , to clear record JUMP           MAINLOOP    Start processing forms
```

```
,  *******************************************************************
,       Read the next form, check for proper identification marks
,  *******************************************************************
MAINLOOP            READ                              , Read a document
                    FORM              F 1 1,01DO_OMR  , Check form ID DISPLAY           17,UNREC_MSG
                    JUMP              END_BADYELLOW
UNREC_MSG           TEXT              "Unrecognized form"

,  *******************************************************************
,       Process the OMR responses: build basic information in data record
,  *******************************************************************

DO_OMR
    ,   "Resolve" responses, i.e. change marks to meaningful characters
                    NUMERIC           F V 10  12 06,36 01,01 DR_IDNUMBER
                    RESOLVE           F S  2 '1' 11,12 00,03 DR_CHANGEYN        , 1,2
                    RESOLVE           F P  3 'A' 29,09 01,00 DR_AGE             , A-C
                    RESOLVE           F S  2 'D' 29,14 01,00 DR_AGE             , D-E
                    ITEM              F H  2   2 34,13 01,03 DR_APPLIANCE       , 1,2
                    ITEM              F H  2   2 37,13 01,03 DR_APPLIANCE+2     , 1,2
                    RESOLVE           F P  1 'A' 30,19 01,00 DR_RESPONS         , A
                    RESOLVE           F P  2 'B' 32,19 01,00 DR_RESPONS         , B,C
                    RESOLVE           F S  3 'D' 35,19 01,00 DR_RESPONS         , D-F
                    NUMERIC           F V 10   5 43,06 01,01 DR_COUNT_A         , 0-9
                    NUMERIC           F V 10   5 43,15 01,01 DR_COUNT_B
                    NUMERIC           F V 10   5 43,24 01,01 DR_COUNT_C
                    NUMERIC           F V 10   5 43,33 01,01 DR_COUNT_D
                    NUMERIC           F V 10   5 43,42 01,01 DR_COUNT_E ,   Convert to "Y" or "N" for Y/N items
                    TRANSLATE         A 1 2  TR_12 TR_YN    DR_CHANGEYN          , 1
item
                    TRANSLATE         A 4 2  TR_12 TR_YN    DR_APPLIANCE         , 4
items ,   Check for appropriate number of "TRACKS" 63 front, don't care on back
                    TRACKS            63,-1 DO_IMAGE
                    DISPLAY           17 TRACKS_MSG
                    JUMP              END_BADRED TRACKS_MSG          TEXT              "Track count error"

,  *******************************************************************
,       Do the appropriate image process
,  *******************************************************************
DO_IMAGE MOVE              1 IMAGE_FLAG DR_IMAGETYPE    , Save the type of image
                    COMPARE           E 1 '1'           DR_IMAGETYPE  DO_ADDRESS
                    COMPARE           E 1 '2'           DR_IMAGETYPE  DO_OPEN
                    COMPARE           E 1 '3'           DR_IMAGETYPE  DO_SIGNATURE
                    COMPARE           E 1 '4'           DR_IMAGETYPE  DO_ADDRCHANGE
                    COMPARE           E 1 '5'           DR_IMAGETYPE  DO_PHOTO
                    JUMP              END_OK            , No Image processing
```

```
,------------------Process ADDRESS BLOCK image: Type 1 -------------------
,*******************************************************************************
,
, Hand-written name and address block
,    Ignore the form for unqualified applicants, i.e. ignore form if
,    applicant under 35 (or no age), and ignore for non-management
,
,    If qualified and no apparent address, i.e. OMR does not detect marks,
,    "select" the form for examination and do not process.
,
,    If qualified and apparent address, save record and save image
,
,*******************************************************************************

DO_ADDRESS
                    Ignore address if under 35, or if not management
                    EDIT         0 1       DR_AGE       END_OK , Bypass if omitted
                    COMPARE      E 1 'A' DR_AGE         END_OK , or if <35
                    COMPARE      G 1 DR_RESPONS 'D' END_OK , or responsibility "Resolve" all (unprinted) OMR response areas in the field
                to see if any marks are detected
                    From row 4, column 5, through row 8, column 22
                    RESOLVE      F P 18 1 04,05 00,01 DR_IMAGEMARK
                    RESOLVE      F P 18 1 05,05 00,01 DR_IMAGEMARK
                    RESOLVE      F P 18 1 06,05 00,01 DR_IMAGEMARK
                    RESOLVE      F P 18 1 07,05 00,01 DR_IMAGEMARK
                    RESOLVE      F P 18 1 08,05 00,01 DR_IMAGEMARK If no mark was found, then there is no image to process
                For Address Block, this is an error & form will be rejected
                    COMPARE      E 1 '-' DR_IMAGEMARK  NO_IMAGE A mark was found....
                    MOVE         1'X' OR_IMAGEMARK
                    IMAGE        F 177,105 333,485 Offset    , Save the image to disk
                    ENCODE       D 6 Offset, DR_OFFSET       , Save as 6 digit offset
                    JUMP         END_OK ,---------------------Process Open_ended item: Type 2----------------------
,*******************************************************************************
, Open-ended question
,   If a mark F (for "OTHER") is completed, AND if a mark is detected in
,   the area, the image for the open_ended question is saved in the image file.
,*******************************************************************************

DO_OPEN
                    Ignore address if under 35, or if not management
                    COMPARE    N 1 'F' DR_RESPONS END_OK , Bypass if not 'F'

"Resolve" all (unprinted) OMR response aeras in teh field
                to see if any marks are detected
                    From row 38, columns 26 through 35
                    RESOLVE      F S 10 1 38,26 00,01 DR_IMAGEMARK If no mark was found, then there is no image to process
                For open-ended item this is NOT an error and image area is
                ignored
                    EDIT         0 1 DR_IMAGEMARK   NO_IMAGE
```

```
             A mark was found....
                MOVE         1 'X' DR_IMAGEMARK
                IMAGE        F 1021,405 1053,589 Offset    , Save the image to disk
                ENCODE       D 6 Offset, DR_OFFSET         , Save as 6 digit offset
                JUMP         END_OK ,-----------------------Process Open_ended item: Type 3 ---------------------
,****************************************************************************
, Signature...
,   The signature is REQUIRED, and the form will be rejected if no
,   marks are detected (by OMR) in the area covering the signature
,   response
,****************************************************************************

DO_SIGNATURE
,                "Resolve" all (unprinted) OMR response areas in the field
,                to see if any marks are detected
                    From Row 56 column 13 through row 60 column 35
                    RESOLVE      F P 23 1 56,13 00,01 DR_IMAGEMARK
                    RESOLVE      F P 23 1 57,13 00,01 DR_IMAGEMARK
                    RESOLVE      F P 23 1 58,13 00,01 DR_IMAGEMARK
                    RESOLVE      F P 23 1 59,13 00,01 DR_IMAGEMARK
                    RESOLVE      F P 23 1 60,13 00,01 DR_IMAGEMARK ,                If no mark was found, then there is no image to process
,                For Signature, this is an error & form will be rejected
                    EDIT         0 1 DR_IMAGEMARK NO_IMAGE A mark was found....
                    MOVE         1 'X' DR_IMAGEMARK
                    IMAGE        F 1453,237 1633,737 Offset   , Save the image to disk
                    ENCODE       D 6 Offset, DR_OFFSET        , Save as 6 digit offset
                    JUMP         END_OK ,----------------------Process ADDRESS Change image: type 4 ---------------
,****************************************************************************
, Only do this area if the "Y" for address change is completed.
,
, If "Y" is filled out, each line (of six) are examined through OMR
, to detect the presence of marks, thereby indicating the presence of
, changes. If one or more is found, the image will be saved, but only
, from the top of the first line with changes through the bottom of
, the last line with changes. Therefore, from 0 to six lines may be
, saved. NOTE: if not marks are found, the address change lines are
, ignored.

,   NOTE: This example shows how OMR can control the SIZE of the image
,         processed in addition to whether or not an image is saved ,****************************************************************************
DO_ADDRCHANGE
                    COMPARE      N 1 'Y' DR_CHANGEYN END_OK   , Requires OMR bubble ,   Locate the first and last line of address changes....
,   Save only those that are needed: IMAGECMD+2/3 has first line #
,                                    IMAGECMD+6/7 has last  line #
                    MOVE         2 0 IMAGECMD+2              , 00 = No first line
,   LINE 1: Look for Title/Phone number line changes
                    RESOLVE      F S 31 1 14,02 00,01 DR_IMAGEMARK
                    EDIT         0 1 DR_IMAGEMARK LINE_2
                    MOVE         2 433 IMAGECMD+6            , Set last line
                    COMPARE      E 2 00 IMAGECMD+2 LINE_2
                    MOVE         2 437 IMAGECMD+2            , Set first line
```

```
DO_PHOTO             , "Resolve" all (unprinted) OMR response areas in the field
        ,              to see if any marks are detected
                            RESOLVE      F P 15 1 29,32 00,01 DR_IMAGEMARK
                            RESOLVE      F P 15 1 30,32 00,01 DR_IMAGEMARK
                            RESOLVE      F P 15 1 31,32 00,01 DR_IMAGEMARK
                            RESOLVE      F P 15 1 32,32 00,01 DR_IMAGEMARK
                            RESOLVE      F P 15 1 33,32 00,01 DR_IMAGEMARK
                            RESOLVE      F P 15 1 34,32 00,01 DR_IMAGEMARK
                            RESOLVE      F P 15 1 35,32 00,01 DR_IMAGEMARK
                            RESOLVE      F P 15 1 36,32 00,01 DR_IMAGEMARK
                            RESOLVE      F P 15 1 37,32 00,01 DR_IMAGEMARK
                            RESOLVE      F P 15 1 38,32 00,01 DR_IMAGEMARK
                     , If no mark was found, then there is no imiage to process
                     , For Address Block, this is not an error & form will be accepted
                            EDIT         0 1 DR_IMAGEMARK  END_OK , A mark was found....
                            MOVE         1 'X' DR_IMAGEMARK
                     , Note: Change and restore system control variable: ImageDepth
                            MOVE         1 8   ImageDepth         , 8 bit gray scale
                            IMAGE        F 793,625 1053,909 Offset , Save the image to disk
                            MOVE         1 1   ImageDepth              , back to 1 bit (default)
                            ENCODE       D 6 Offset, DR_OFFSET    , Save as 6 digit offset
                            JUMP         END_OK NO_IMAGE                    DISPLAY      15 NO_IMAGEMSG
                            JUMP         END_BADYELLOW
NO_IMAGEMSG                 TEXT         "No image found!"
        , *********************************************************************
                     END OF FORM ROUTINES
        , *********************************************************************

END_OK                      MOVE         2 CRLF  DR_CRLF     , add a CR LF sequence to end
                            WRITE        102 DATA_RECORD
                            JUMP         MAINLOOP END_BADYELLOW               BIN          Y                   , Select the "yellow" output bin
                            DELETE       S,                  , Write nothing
                            WRITE        102 DATA_RECORD
                            JUMP         MAINLOOP , *********************************************************************
                     END OF RUN AND OTHER MANUAL ENTRY POINTS
        , *********************************************************************

ShowImage                   ENTRY
                            SYSTEM       60
                            BREAK End_Program                 ENTRY
                            END
                            BREAK
```

```
,   LINE 2: Look for Name changes
LINE_2          RESOLVE     F S 45 1 17,02 00,01 DR_IMAGEMARK
                EDIT        0 1 DR_IMAGEMARK  LINE_3
                MOVE        2 497 IMAGECMD+6                    , Set last line
                COMPARE     E 2 00 IMAGECMD+2 LINE_3
                MOVE        2 533 IMAGECMD+2                    , Set first line ,   LINE 3: Look for Farm Name changes
LINE_3          RESOLVE     F S 37 1 19,02 00,01 DR_IMAGEMARK
                EDIT        0 1 DR_IMAGEMARK  LINE_4
                MOVE        2 557 IMAGECMD+6                    , Set last line
                COMPARE     E 2 00 IMAGECMD+2 LINE_4
                MOVE        2 593 IMAGECMD+2                    , Set first line ,   LINE 4: Look for Address Line 1 changes
LINE_4          RESOLVE     F S 37 1 22,02 00,01 DR_IMAGEMARK
                EDIT        0 1 DR_IMAGEMARK  LINE_5
                MOVE        2 621 IMAGECMD+6                    , Set last line
                COMPARE     E 2 00 IMAGECMD+2 LINE_5
                MOVE        2 657 IMAGECMD+2                    , Set first line ,   LINE 5: Look for Address Line 2 changes
LINE_5          RESOLVE     F S 37 1 24,02 00,01 DR_IMAGEMARK
                EDIT        0 1 DR_IMAGEMARK  LINE_6
                MOVE        2 681 IMAGECMD+6                    , Set last line
                COMPARE     E 2 00 IMAGECMD+2 LINE_6
                MOVE        2 717 IMAGECMD+2                    , Set first line ,   LINE 6: Look for City/State/Zip changes
LINE_6          RESOLVE     F S 45 1 27,02 00,01 DR_IMAGEMARK
                EDIT        0 1 DR_IMAGEMARK  LINE_X
                MOVE        2 741 IMAGECMD+6                    , Set last line
                COMPARE     E 2 00 IMAGECMD+2 LINE_X
                MOVE        2 781 IMAGECMD+2                    , Set first line ,               If no mark was found, then there is no image to process
,               For Address Block, this is not an error & form will be accepted
LINE_X          MOVE        1 ' ' DR_IMAGEMARK
                COMPARE     E 2 0 IMAGECMD+2  END_OK ,               A mark was found.... the start and end line have been set
                MOVE        1 'X' DR_IMAGEMARK
IMAGECMD        IMAGE       F 160,049 355,913 Offset    , Save the image to disk
                ENCODE      D 6 Offset, DR_OFFSET       , Save as 6 digit offset
                JUMP        END_OK , ------------------------Process PHOTO:  Type 5--------------------
, ****************************************************************
, PHOTO: this shows changing the "depth" of the image from one to
,    eight bits (i.e. from black & white image to 256 gray-scale)
,
, This image is saved only when the OMR process detects marks
, ****************************************************************
```

The following program outline is written in the "PASCAL" language to demonstrate the retrieval and display of images.

```
*******************************************************************************
Copyright © UNISCORE, Incorporated                          ALL RIGHTS RESERVED
         MeadowBrook Industries, Inc.

This code is provided as a demonstration of proceedures to utilize OMR and image processing
    on the same document, and is solely for use (1) in association with a patent disclosure, and
    (2) as a demonstration of the combined use of OMR and image processing.
******************************************************************************* program IM_LABEL;
Uses
    CRT, Dos, Files, Graph, Printer, Constant,
    HPLaser, Images, Windows, Strings;
Var
    ScanFileName,
    ImageFileName :   String;
    Offset    :   LongInt;

InputImage : Pointer;

Ch      :     Char;

ChTemp,
    ChMask1,
    ChMask:     Byte;

ShowFile :  Text;

LabelCount : Word;
    Index,
    Index1, Index2,
    Val1,  Val2,
    GPixel,
    GbaseX, GBaseY,
    Pixels, Lines:  Word;

HoldCount     :  Word;
    HoldString    :  Array[1..8] of String;
    ScanRecord,
    OffsetString,
    ImageString   :  String HardCopy      :  Boolean;

thr,tmin,tsec,thun:  Word;
    TSecond,
    Second, Duration  :  Real;

GraphImagePointer    :  pointer;
    GraphImageSize       :  Word;

ScanFile         :  Text;

var
    GraphDriver :  Integer;
    GraphMode   :  Integer;
    LowMode     :  Integer;
    HighMode    :  Integer;
```

```
Procedure OpenGraphScreen;
begin
    GraphDriver := Detect;
    InitGraph(GraphDriver, Graph Mode, '');
    if GraphResult <> grOk then Halt(1);
    GetModeRange(GraphDriver, LowMode, HighMode);
    SetGraphMode(HighMode);
    SetBKColor(0);
    SetFillStyle(CloseDotFill,1);
    BAR(0,0,GetMaxX,GetMaxY);
end;

begin
    Offset   :=0;
    ImageString := SPACES(255);

ClrScr;
    GoToXY(4,4);
    While ChooseFileOK(ScanFileName,'IN*.DTA',4,4,False) DO
        begin
            ClrScr;

HardCopy := YesNoWindow('Send to Printer?');

ImageFileName := GiveExtension(TRIM(ScanFileName),'UIM');
            Assign(ScanFile,ScanFileName);
            Input Image := ImageFileOpen(ImageFileName,False);
            Reset(ScanFile);
            IF HardCopy THEN
                begin
                    GetTime(thr,tmin,tsec,thun);
                    TSecond := tsec + 60.0 * (tmin + 60.0 * thr) + ((0.0 + thun) / 100.0);
                    MarginClear;
                    CursorXY(1.0,-0.20);

{ Set to letter gothic 12 }
                    Write (1st,CHR(27),'(OU',CHR(27),'(sOp12.00h12.00v0s0b6T');

Write(1st,'UNISCORE Incorporated: Name and Address list...');
                    CursorXY(0.5,10.25);
                    Write(1st,'"MY ADDRESS LABELS" Copyright (C) 1991: UNISCORE, Incorporated
                    ALL RIGHTS RESERVED');
                end;

LABELCOUNT :=0;

While NOT (EOF(ScanFile) OR (LabelCount = 30)) DO
                begin
                    ReadIn(ScanFile,ScanRecord);
                    OffsetString := COPY(ScanRecord,180,9);
                    If OffSetString = SPACES(9) THEN
                        MessageWindow ('Bypassed record .. no offset value ')
                    ELSE
                        begin
                            VAL(OffsetString,Val1,Val1);
                            Offset := Val1;

IF ImageFileSet (InputImage, Offset, Pixels, Lines) THEN
                                begin
                    GetTime(thr,tmin,tsec,thun);
                    Second := tsec + 60.0 * (tmin + 60.0 * thr) + ((0.0 + thun) / 100.0);
```

```
            IF HardCopy THEN
                begin
                    CursorXY(0.0 + (2.625 * (LabelCount div 10)), 0.050 + (1.0 * (LabelCount
                    mod 10)) );
                    INC (LabelCount);
                    WriteIn('Ready to read image ',LabelCount,' with~',Lines,' lines of
                    ',pixels,' pixels');
                    SetupHPGraphics(150,True);

end
            ELSE
                begin
                    OpenGraphScreen;
                    OutTextXY(40,40,'Graphic for '+NumStr(Lines,3,0)+' lines, and '+
                        NumStr(Pixels,4,0)+' pixels ');
                    GBaseX := (GetMaxX - 1 - Pixels) div 2;
                    GBaseY := (GetMaxY - 1 - Lines ) div 2;
                    If (GBaseX > 10) AND (GBaseY > 20) THEN
                        begin
                            SetLineStyle(SolidLn,0,ThickWidth);
                            Graph.SetColor(Red);
                            Line(GBASEX-10,GBASEY-10,GBASEX+Pixels+10,GBaseY-10);
                            Line(GBASEX-10,GBASEY+Lines+10,GBASEX+Pixels+10,GBaseY+Lines+10);
                            Line(GBASEX+Pixels+10,GBASEY-10,GBASEX+Pixels+10,GBaseY+Lines+10);
                            Line(GBASEX-10,GBASEY-10,GBASEX-10,GBaseY+Lines+10);
                        end;
                end;

For Index := 1 TO Lines DO
                begin
                    ImageString := ImageFileLineGet(InputImage);
                    IF HardCopy THEN
                        begin
                            IF Index MOD 5 = 0 THEN Write(Index:3);
                            SendHPGraphics(Length(ImageString),ImageString[1]);
                        end
                    ELSE
                        begin
                            GPixel := 0;
                            For Index 1 := 1 to Length(ImageString) DO
                                begin
                                    ChMask := $80;
                                    Repeat
                                        IF (GPixel+1 <= GetMaxX) AND (Index+1 <= GetMaxY)
                                            AND (GPixel <= Pixels) THEN
                                            begin
                                                IF (ChMask AND ORD(ImageString [Index1])) = 0 THEN
                                                    PutPixel(GBasex+GPixel+1,GBaseY+Index,11)
                                                ELSE
                                                    PutPixel(GBasex+GPixel+1,GBaseY+Index,0)
                                            end;
                                        INC(GPixel);
                                        ChMask := ChMask SHR 1;

Until ChMask = 00;
                                end;
                        end;
                end;

GetTime(thr,tmin,tsec,thun);
Duration := (tsec + 60.0 * (tmin + 60.0 * thr) + ((0.0 + thun) / 100.0))
            - Second;
```

```
    If HardCopy THEN
        begin
            EndHPGraphics;
            WriteIn;

WriteIn(' Duration ', Duration:5:2, ' Seconds ... Done!');
            end
        ELSE
            begin
                OutTextXY(40,GetMaxY-20,' Duration '+NumStr(Duration,5,2)+' Seconds ...
                Done!');

GraphImageSize := ImageSize(GbaseX,GBasey,GBaseX+Pixels-1,GBasey+Lines-1);
                GetMem(GraphImagePointer, GraphImageSize); { Get memory from heap }
                GetImage(GbaseX,GBasey,GBaseX+Pixels=1,GBasey+Lines-1,GraphImagePointer');
                ReadLn;
                ClearDevice;
                PutImage(10, 10, GraphImagePointer', NormalPut);
                FreeMem(GraphImagePointer, GraphImageSize); { Get memory from heap }
                ReadLn;
                RestoreCRTMode;
                Close Graph;
                TextMode (Co80);
                ClrScr;
            end;
        end;
    end;
end;
ClrScr;

If HardCopy THEN
    begin
        GetTime(thr,tmin,tsec,thun);
        Duration := (tsec + 60.0 * (tmin + 60.0 * thr) + ((0.0 + thun) / 100.0))
                    - TSecond;
        WriteIn(' Duration ', Duration:6:2, ' Seconds for ',labelCount,' labels.');
    end;
    GoToXY(4,4);
    ImageFileClose(InputImage);
end;
end.
```

I claim:

1. A method of combined optical mark reading ("OMR") and image processing comprising:
providing a response sheet having thereon a grid of response positions suitable for marking and for processing by OMR and at least one response area for a response of an alphanumeric or pictorial nature at a predetermined position, said response area encompassing at least one of said positions suitable for marking and for processing by OMR, whereby a response in the response area creates in at least one response position encompassed by said response area a mark capable of detection and reading by OMR;
scanning the response sheet by OMR to detect by OMR the presence of marks at response positions in the grid;
sensing in said response area by OMR for marks capable of detection and reading by OMR; and
in response to said sensing step, selectively capturing and storing in electronic memory concurrently with said OMR scanning step the image of a response of an alphanumeric or pictorial nature in said response area wherein the image is of finer resolution than the resolution of the grid response positions.

2. A method in accordance with claim 1, wherein said storage step comprises the further steps of creating a text file containing data resulting from processing by OMR; and creating a second file containing in binary image form digital representations of stored images, for each image its offset relative to the start of the file being stored within said text file in the record corresponding to the document from which the image was captured.

3. A method in accordance with claim 1, and the further step of providing on the sheet a set comprising at least one additional position, all of the positions in said set being within the response area, sensing of marks at positions in the set determining the portions of the response area to be captured.

4. A method in accordance with claim 3, wherein said storage step comprises the further steps of creating a text file containing data resulting from processing by OMR; and creating a second file containing in binary image form digital representations of stored images, for each image its offset relative to the start of the file being stored within said text file in the record corresponding to the document from which the image was captured.

* * * * *